April 25, 1961 J. ROSENKRANDS 2,981,353
SWING AXLE REAR SUSPENSION
Filed Feb. 26, 1959 2 Sheets-Sheet 1

INVENTOR.
Johannes Rosenkrands
BY
W. H. Wagner
ATTORNEY

April 25, 1961   J. ROSENKRANDS   2,981,353
SWING AXLE REAR SUSPENSION
Filed Feb. 26, 1959   2 Sheets-Sheet 2

INVENTOR.
Johannes Rosenkrands
BY
W. H. Wagner
ATTORNEY

United States Patent Office 2,981,353
Patented Apr. 25, 1961

2,981,353
SWING AXLE REAR SUSPENSION

Johannes Rosenkrands, Detroit, Mich., assignor to General Motors Corporation, Detroit, Mich., a corporation of Delaware Filed Feb. 26, 1959, Ser. No. 795,675

8 Claims. (Cl. 180—73)

This invention relates to vehicle suspension and more particularly to swing axle suspension for the driving wheels of a vehicle.

The invention herein disclosed is concerned primarily with swing axle rear wheel suspension of the general type disclosed in copending application Serial No. 758,423, Oliver K. Kelley, entitled Independent Rear Wheel Suspension, assigned to General Motors Corporation, wherein individual half axle assemblies are pivotally secured to the sprung mass about a common longitudinally extending axis and each assembly has incorporated therein separate torque multiplying power transmission means operatively connected to the vehicle driving wheels.

An object of the invention is to provide an improved swing axle suspension for the rear wheels of a vehicle.

Another object is to provide a swing axle type rear wheel suspension which is capable of inducing a predetermined degree of understeer responsive to roll deflection of the sprung mass and of resisting squatting or downward deflection of the sprung mass during vehicle acceleration.

A further object is to provide an arrangement of the character described wherein the power transmission means for each half axle is constructed and arranged so that torque reaction is applied to the vehicle sprung mass partly through the power transmission means and partly through suitable linkage interconnecting the axle and the sprung mass.

In accordance with the general features of the invention, a pair of traction wheels are rotatably mounted respectively on the outer ends of a pair of oppositely extending half axle assemblies, the inboard ends of which are pivotally secured to the sprung mass of a vehicle on a horizontal longitudinally extending axis. Each of the half axle assemblies includes outer and inner portions which are rotatable with respect to each other about a transversely extending axis common to both. The inner portion of each half axle assembly encloses the turbine section of a torque converter type transmission, while the outer portion includes a ring gear meshing with planet gears which are carried by the inner end of a wheel driving axle. The planet gears, in turn, engage a sun gear driven by the output section of the turbine whereby torque reaction incident to power application through the turbine is taken partly by the inner portion of the housing and partly by the outer portion of the housing. Torque reaction of the outer portion is then applied to the sprung mass of the vehicle by means of a pair of longitudinally extending linkage members connected between the sprung mass and the outer portion of the half axle assembly.

Other objects, advantages, and features of the invention will become more fully apparent as reference is had to the accompanying specification and drawings wherein.

Figure 1:
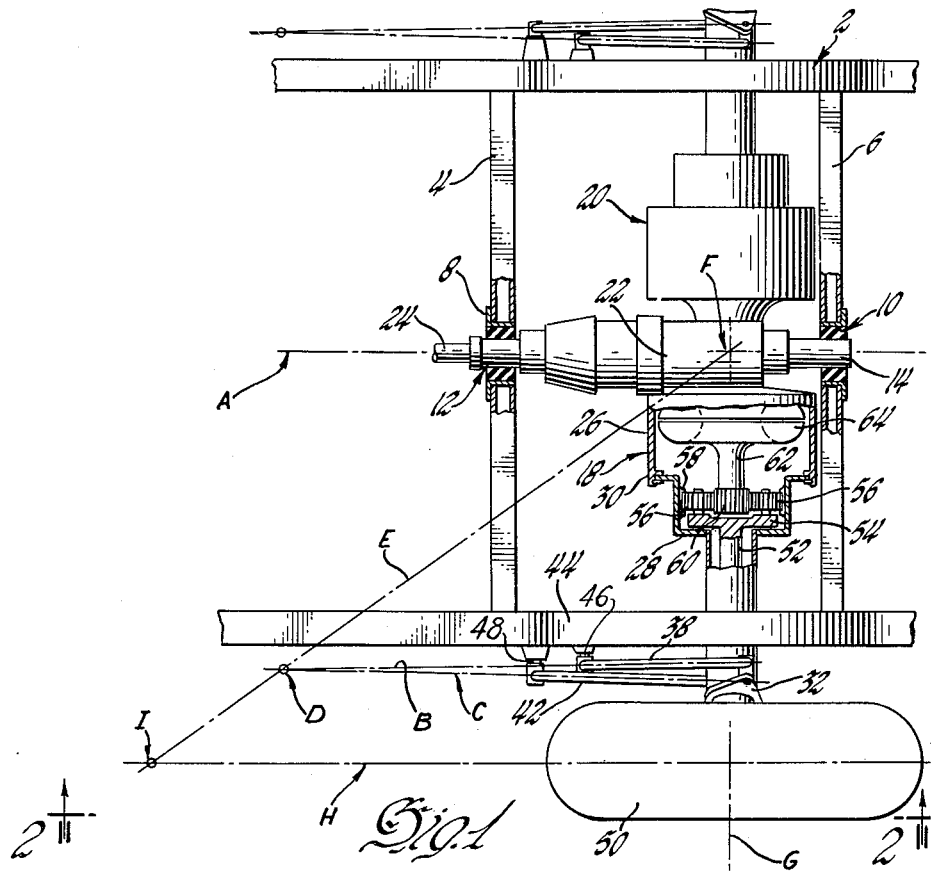
Fig. 1 is a top plan view of the rear portion of a vehicle chassis incorporating swing axle suspension in accordance with the invention, certain parts being broken away and in section in order to more clearly illustrate the construction thereof.

Referring now to Fig. 1, there is shown a vehicle chassis in which the frame portion of the sprung mass is designated generally by the reference numeral 2. Frame 2 includes a pair of longitudinally spaced cross members 4 and 6 which at their midportions are provided with flexible bushings 8 and 10. Bushings 8 and 10 provide supports for forward and rearward shaft portions 12 and 14 which define the common pivot axis A for transversely extending half axle assemblies 18 and 20. As seen best in Fig. 1, axle assembly 18 includes an inner longitudinally extending housing 22, which encloses a drive pinion assembly, not shown, adapted to be driven by engine driven propeller shaft 24. With the foregoing exception, assembly 20 is similar to assembly 18, and it will, therefore, be understood that the following description of assembly 18 also applies to assembly 20.

As seen in Fig. 1, axle assembly 18 includes an inner housing portion 26 and an outer housing portion 28 which are connected together as by flanged lip 30 so that the outer housing may rotate concentrically with respect to the inner housing. Near its outer extremity, outer housing portion 28 has secured thereto a vertically extending bracket 32 which is pivotally connected at its upper end by pin joint 36 to a forwardly and downwardly inclined link 38 and at its lower end by pin joint 40 to a forwardly and upwardly inclined link 42. The forward ends of links 38 and 42 are pivotally connected to frame side rail 44 by pin joints 46 and 48. A traction wheel 50 is rotatably mounted at the outer extremity of axle housing outer portion 28 and is operatively connected to a drive axle 52 arranged concentrically within axle assembly outer portion 28. At its inner end, drive axle 52 is provided with a flange 54 upon which are rotatably supported a plurality of planet gears 56 which coincidentally mesh with a ring gear 58 formed internally of housing portion 28 and with a sun gear 60 formed on the output shaft 62 of a torque converter turbine 64 disposed within housing inner portion 26. It will be understood that the input sides of the torque converter contained in both axle assemblies 18 and 20 are driven non-differentially by the pinion shaft contained in housing 22 via suitable gearing, not shown. Since the specific details of this portion of the construction form no part of the invention, description thereof will be omitted, it being understood that any suitable arrangement may be employed, as for example, the type shown in copending application Serial No. 758,423, previously referred to.

Figure 2:
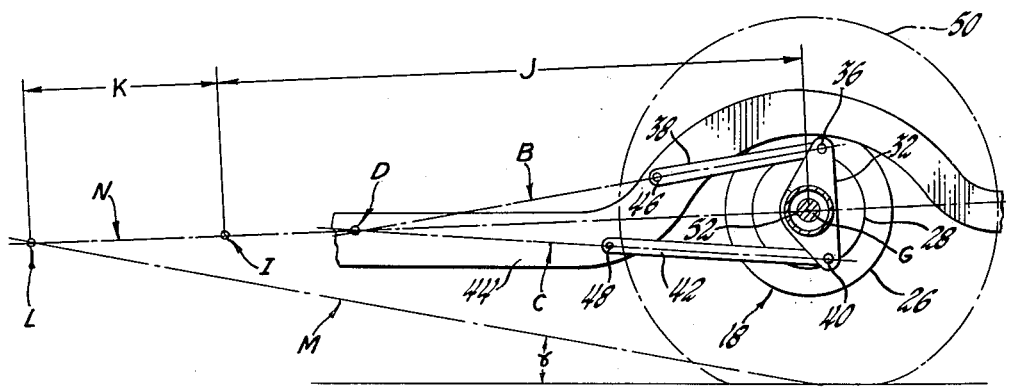
Fig. 2 is a side elevational view looking in the direction of arrows 2—2 of Fig. 1.
Figure 3:
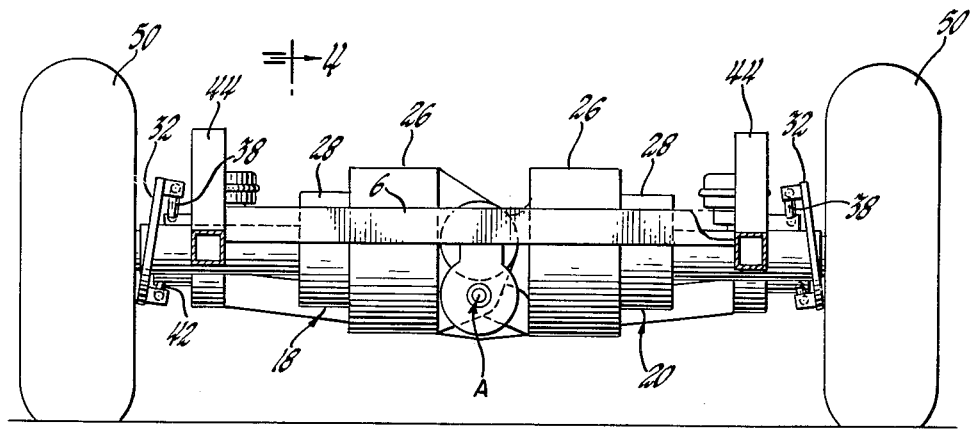
Fig. 3 is a rear end elevation of the structure shown in Fig. 1.
Figure 4:
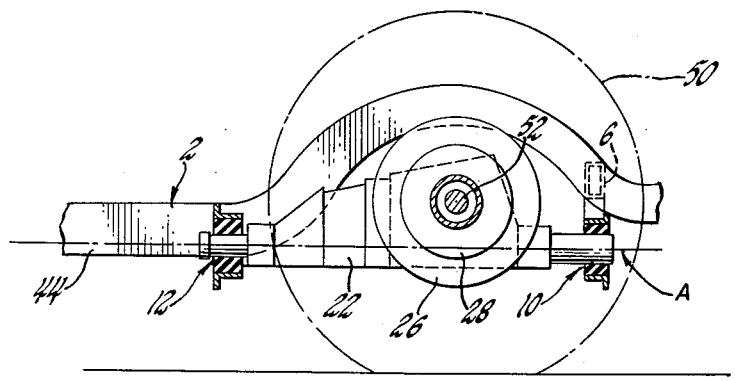
Fig. 4 is a side elevational view looking in the direction of arrows 4—4 of Fig. 3.

According to one feature of the invention, outer housing 28 is connected to the sprung mass by links 38, 42 in such a way that the projected axes B and C thereof intersect at effective hinge point D. An imaginary axis E extended from the point F at the intersection of the wheel rotation axis G and common pivot axis A through the effective hinge point D intersects the wheel plane H at point I. Therefore, the effective swing arm in the wheel plane H is of the magnitude J. From analysis it has been determined that for any given reduction gear ratio of the power transmission means, a corresponding ratio will exist between the distances J and K where J represents the distance between axle center line G and point I, and K represents the distance between point I and the point L at which the anti-squat line of force M intersects a line N passing through axis G and point I in wheel plane H. Since the angle γ of line M with respect to the ground determines the degree of anti-squat obtained, by proper selection of the reduction gear ratio, any degree of anti-squat may be obtained. By calculation, it has been determined that 100% resistance to acceleration squat is obtained when the tangent of γ equals the height of the vehicle center of gravity divided by the vehicle wheel base. In practice, the invention is conveniently applied to a given vehicle by first determining the wheel base and center of gravity thereof from which the angle γ is derived. The line of force M is then inscribed as shown in Fig. 2. The ratio of J to K is then readily determined by direct measurement and a transmission reduction gear ratio is selected which corresponds thereto.

According to another feature of the invention, the effective hinge point D of links 38 and 42 is located forwardly and below wheel axis G (Fig. 2). Therefore, under conditions of vehicle roll, upward deflection of the wheel at the outboard side of the vehicle induces a forward component of movement with respect to the chassis, while downward deflection of the wheel at the inboard side induces a rearward component of movement. Accordingly, the wheels assume a steer angle with respect to the longitudinal center line of the vehicle which tends to steer the vehicle out of the turn in which it is engaged and thus produce the so-called understeer geometry.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. Independent suspension for a vehicle driving wheel comprising, a frame, a swing axle assembly pivoted to said frame on a longitudinal axis, said assembly including an inner and an outer housing rotatable relative to each other about a common transverse axis, driving means for said wheel extending through said housings, said driving means including torque multiplying means associated with said housings so that driving torque reaction is taken partly by said inner housing and partly by said outer housing, and means interconnecting said outer housing and said frame effective to utilize torque reaction of the former to resist vehicle acceleration squat.

2. Independent suspension for vehicle driving wheels comprising, a frame, a pair of swing axle assemblies pivoted to said frame on a common longitudinal axis, each of said assemblies including an inner and an outer housing rotatable relative to each other about a common transverse axis, driving means for said wheel extending through said housings, said driving means including torque multiplying means associated with said housings so that torque reaction is taken partly by said inner housing and partly by said outer housing, and longitudinally extending linkage means interconnecting the outer housing of each assembly and said frame effective to transform torque reaction of the former into a thrust component resisting vehicle acceleration squat.

3. The structure set forth in claim 2 wherein said linkage means comprises a pair of links between each outer housing and said frame.

4. The structure set forth in claim 3 wherein the links of each pair are arranged in forwardly converging relation.

5. The structure set forth in claim 4 wherein each link is pivotally connected to both said frame and said outer housing.

6. Independent suspension for vehicle driving wheels comprising, a frame, a pair of swing axle assemblies pivoted to said frame on a horizontal longitudinally extending common axis, each of said assemblies including an inner and an outer housing portion arranged in axial alignment and connected together for relative rotation about their common transverse axis, driving means for said wheel extending through said housings and operatively engaging the former, said driving means including torque multiplying means associated with said housings so that driving torque reaction is taken partly by said inner housing and partly by said outer housing, and a pair of longitudinally directed links extending between said outer housing and said frame effective to transform torque of said outer housing into a thrust component acting on said frame to resist vehicle acceleration squat, said links being pivotally connected to said outer axle housing at vertically spaced points and to said frame at spaced points located so that the projected axes of said links converge forwardly of said axle.

7. Independent suspension for vehicle driving wheels comprising, a frame, a pair of swing axle assemblies pivoted to said frame on a horizontal longitudinally extending common axis, each of said assemblies including an inner and an outer housing portion arranged in axial alignment and connected together for relative rotation about their common transverse axis, driving means for said wheel extending through said housings and operatively engaging the former, said driving means including torque multiplying means having reduction gearing associated with said outer housing so that driving torque reaction is taken partly by said inner housing and partly by said outer housing, and a pair of longitudinally directed links extending between said outer housing and said frame effective to transform rotary torque reaction of said outer housing into a thrust component acting on said frame to resist vehicle acceleration squat, said links being pivotally connected to said outer axle housing at vertically spaced points adjacent the associated wheel and to said frame at spaced points located so that the projected axes of said links converge at a point forwardly of said axle and at a vertical level below the axis of rotation of said wheel.

8. The structure set forth in claim 7 wherein said reduction gearing comprises a planetary gearset in which the ring gear is mounted on said outer housing.

References Cited in the file of this patent

UNITED STATES PATENTS

| | | |
|---|---|---|
| 1,974,230 | Armington | Sept. 18, 1934 |
| 2,529,330 | Double | Nov. 7, 1950 |
| 2,806,542 | Scherenberg et al. | Sept. 17, 1957 |
| 2,843,214 | Muller | July 15, 1958 |